US011824201B1

(12) United States Patent
Bosnyak et al.

(10) Patent No.: US 11,824,201 B1
(45) Date of Patent: Nov. 21, 2023

(54) DISPERSIBLE DISCRETE CARBON NANOTUBES IN DRY FABRICATION PROCESSES FOR ENERGY STORAGE AND COLLECTION DEVICES

(71) Applicant: MOLECULAR REBAR DESIGN, LLC, Austin, TX (US)

(72) Inventors: Clive P. Bosnyak, Dripping Springs, TX (US); Paul Everill, Austin, TX (US); Kurt W. Swogger, Austin, TX (US); Carlos J. Ramirez, San Marcos, TX (US)

(73) Assignee: MOLECULAR REBAR DESIGN, LLC., Austin, TX (US)

( * ) Notice: Subject to any disclaimer, the term of this patent is extended or adjusted under 35 U.S.C. 154(b) by 0 days.

(21) Appl. No.: 18/071,366

(22) Filed: Nov. 29, 2022

(51) Int. Cl.
*H01M 4/62* (2006.01)
*H01M 10/0525* (2010.01)
*H01M 4/02* (2006.01)

(52) U.S. Cl.
CPC ........... *H01M 4/625* (2013.01); *H01M 4/622* (2013.01); *H01M 10/0525* (2013.01); *H01M 2004/021* (2013.01)

(58) Field of Classification Search
CPC .. H01M 4/625; H01M 4/622; H01M 10/0525; H01M 2004/021
USPC ........................................................ 429/232
See application file for complete search history.

(56) References Cited

U.S. PATENT DOCUMENTS

2021/0047185 A1\* 2/2021 Finlayson ............. C01B 32/159

\* cited by examiner

*Primary Examiner* — Gary D Harris
(74) *Attorney, Agent, or Firm* — Hunton Andrews Kurth LLP

(57) ABSTRACT

Provided are compositions of bundles or clumps of a reaggregated plurality of discrete carbon nanotubes with an additive whereupon the bundles or clumps disaggregate during a fabrication process that uses less than 10,000 ppm of aqueous or non-aqueous solvent. The composition can be mixed further with electroactive material to make electrodes for energy storage or collection devices.

17 Claims, 14 Drawing Sheets

DISPERSIBLE DISCRETE CARBON NANOTUBES IN DRY FABRICATION PROCESSES FOR ENERGY STORAGE AND COLLECTION DEVICES

CROSS REFERENCE TO RELATED APPLICATIONS

None

STATEMENT REGARDING FEDERALLY SPONSORED RESEARCH

Not applicable

FIELD OF THE INVENTION

The present invention relates to the field of energy storage and collection devices. More specifically to a composition of bundles or clumps of a reaggregated plurality of discrete carbon nanotubes with an additive whereupon the bundles or clumps disaggregate during a fabrication process that uses less than 10,000 ppm of aqueous or non-aqueous solvent. The composition can be mixed further with electroactive material to make electrodes.

BACKGROUND

There is a continuing need to improve the performance-cost ratio of energy and collection devices such as, but not limited to batteries, capacitors, and photovoltaics. Performance gains can be made by materials selection and design of the device while costs can be reduced by using lower cost or less amounts of materials, the design of the device and improvements in manufacturing. In energy storage devices like batteries and capacitors, reducing the manufacturing energy and labor consumption and increasing electrode thickness are two effective methods to lower the manufacturing costs. The fabrication of electrodes for lithium-ion batteries, for example, with a conventional slurry-casting method involves mixing the electroactive material, such as a nickel-manganese-cobalt oxide for the cathode, a polymer that binds the electroactive material, and a conductive additive, such as carbon black, and solvent N-methyl-pyrrolidone (NMP). After several hours of mixing, the slurry is cast on the current collector, dried, and calendered to form electrodes. NMP is a commonly used organic solvent in cathode fabrication, while water is commonly used for anode where the electroactive material is commonly graphite. An oven, dozens of meters long, with a temperature higher than 120° C. is required in the process of drying for both anode and cathode. The energy consumed in slurry making and coating, together with solvent recovery for NMP, can account for as much as 50% of individual device production. Thus, a non-solvent or dry process is an attractive proposition to reduce the cost of making energy storage or collection devices.

There are several approaches possible to create a solvent free process for an electrode including laser technology, radio-frequency magnetron sputtering, dry-spraying, electro-static spray deposition and mixing of the electrode active material, also called electroactive or active material, with additives to help bind the particles. The mixing of the electrode active material with polymer binders and further processing, such as hot calendering, is considered the lowest cost manufacturing route and is easily scalable to large production.

Polytetrafluorethylene (PTFE) also has been demonstrated for solvent free electrode fabrication. For example, in a published article Yang et al. fabricated a silicon oxide anode with PTFE and polyvinylidene fluoride (PVDF) where PTFE, PVDF, silicon oxide and acetylene black were dry mixed and pressed to form the final electrodes [Yang, J.; Takeda, Y.; Imanishi, N.; Capiglia, C.; Xie, J.; Yamamoto, O. SiOx-based anodes for secondary lithium batteries. Solid State Ion. 2002, 152, 125-129.] The PTFE, and possibly PVDF, fibrillates to form a network.

U.S. Pat. No. 8,072,734 B2 disclosed an inexpensive and reliable dry process-based capacitor method for making a self-supporting dry electrode film. Also disclosed in U.S. Pat. No. 8,072,734 B2 is an exemplary process for manufacturing an electrode for use in an energy storage device product, the process comprising supplying dry carbon particles, supplying dry binder, dry mixing the dry carbon particles and dry binder; and dry fibrillizing the dry binder to create a matrix within which to support the dry carbon particles as dry material. The binder employed to fibrillize is a fluoropolymer such as polytetrafluoroethylene, PTFE. Where high shear, processes are involved, PTFE can be stretched to form fiber under high shear, which can act as a net to support active material and conductive additives. The mixture of the electrode component is hot-rolled after mixing under high shear to form a free-standing film and finally laminated with the current collector using hot-rolling again. PTFE, however, is considered by some to be unsuitable for the anode of lithium-ion batteries due to its oxidative instability when applied in anodes. The energy level of the lowest unoccupied molecular orbitals (LUMO) of PTFE is relatively low, which implies that PTFE accepts electrons readily, making it electrochemically unstable in an anodic environment.

It has been found that carbon nanotubes can be used to improve the conductivity of the cathode of a lithium-ion battery in the usual cathode making slurry process with NMP as a solvent medium for the PVDF, or in an anode which conventionally employs water-based slurries of graphite and silicon, for example. U.S. Pat. No. 8,808,909 B2 describes adding discrete carbon nanotubes to enhance the performance of energy storage or collection devices. For the cathode, a general procedure is the carbon nanotubes are passed through high shear equipment at concentrations less than about 4% weight in the NMP and added to the lithium active cathode material together with polyvinylidene difluoride, PVDF, as a binder and additional conductive carbon black. A common formulation might be to add 3% wt. PVDF, 1% wt. multiwall carbon nanotube and 3% wt. carbon black relative to nickel manganese cobalt oxide, NMC. As the slurry is dried the PVDF, carbon black and carbon nanotubes associate and form electron conducting regions with adhesion between the NMC particles and also bind the NMC particles to the aluminum current collector.

The most common method of carbon nanotubes, CNT, synthesis is the catalyzed chemical vapor deposition, CVD, of hydrocarbons over a metal catalyst. Large amounts of CNTs can be formed by catalytic CVD of acetylene over cobalt and iron catalysts supported on silica or zeolite. Fullerenes and bundles of single walled carbon nanotubes were also found among the multiwalled carbon nanotubes produced on the carbon/zeolite catalyst. Supported catalysts such as iron, cobalt, and nickel, containing either a single metal or a mixture of metals, seem to induce the growth of isolated single walled carbon nanotubes or single walled carbon nanotubes bundles in an ethylene atmosphere. The production of single walled carbon nanotubes, as well as double-walled CNTs, on molybdenum and molybdenum-iron alloy catalysts has also been demonstrated. Methane has also been used as a carbon source. Usually, the carbon nanotubes produced by CVD processes result in highly entangled and/or associated bundles of long length carbon nanotubes which are very difficult to separate as individual carbon nanotubes. U.S. Pat. No. 8,808,909 B2 describes a process to obtain discrete carbon nanotubes from such highly entangled bundles.

Discrete carbon nanotubes, whether of single wall, double wall or multiwall (meaning more than two walls) in nature are defined as having two ends, or more if branched, on the same carbon nanotube as can be seen with electron microscopy. The discrete carbon nanotubes could be in the form of individual carbon nanotubes dispersed in a medium, a mat, a rope, oriented or random in placement.

There is great difficulty to disperse discrete carbon nanotubes in an electrode process without employing solvents as their aspect ratio (ratio of length to diameter) is generally greater than about 40 such that the discrete carbon nanotubes in the dry state are usually in the form of highly entangled bundles and, furthermore, may be associated along their length. Single wall carbon nanotubes are most prevalent in forming ropes consisting of many single wall carbon nanotubes associated along much of their length. This means that it is very difficult to disperse the discrete carbon nanotubes as individual carbon nanotubes using dry electrode methods such as dry-spraying, and electro-static spray deposition and simple mixing of the bundles of carbon nanotubes with electrode active material.

A need thus exists for new approaches of producing inexpensive and reliable coherent active material components containing dispersed discrete carbon nanotubes for energy storage and collection devices via dry, i.e., less than 10,000 ppm solvent, fabrication methods. The active material component is considered to be in the form of particles, but could be in other forms such as, but not limited to, a cellular network, fiber, plate or a layer. These active material components with dispersed carbon nanotubes are desired to have one or more of the following qualities: improved consistency and homogeneity of distribution of discrete carbon nanotubes with active materials on microscopic and macroscopic scales; improved tensile strength of film produced from the mixture of active materials and discrete carbon nanotubes; and decreased electrical or ion resistivity compared to the same composition without discrete carbon nanotubes. Yet another need is to be able to disperse the discrete carbon nanotubes without solvent in combination with other materials such as, but not limited to, inorganic or organic particles like polymers, ceramics, cements, metal, metal oxides, metal salts, carbon black, graphene, graphene oxide and carbon fibers for making articles with improved performance such as tensile strength or enhanced electron conductivity than those similar articles without the discrete carbon nanotubes.

SUMMARY

The present invention provides a composition and a method for dispersing discrete carbon nanotubes that are initially in the form of reaggregated bundles substantially without the use of solvents. The composition can be combined with active materials of energy storage and collection devices to form films for electrodes of energy storage and energy collection devices.

One embodiment of this invention is a composition for use in manufacturing an electrode comprising, less than about 10,000 ppm, and as low as less than about 100 ppm, of the composition of an aqueous or non-aqueous solvent, a plurality of discrete carbon nanotubes in the form of reaggregated bundles or clumps, and at least one additive dispersed within the bundles wherein the at least one additive at least partially coats a surface of the discrete carbon nanotubes. As one of ordinary skill in the nanotube art appreciates since at least about 2010 "plurality" has been used to mean more than any other. That is, there is a greater number of nanotubes that are discrete than in, for example, aggregated as bundled or ropes in a representative sample. In some embodiments, greater than about 0%, or greater than about 20%, or greater than about 35%, or greater than about 50%, or greater than about 60%, or greater than about 75%, up to about 100% of the exterior of the nanotube surface may be coated with at least one additive or mixture of additives.

In another embodiment of this invention the composition can further comprise discrete carbon nanotubes wherein the discrete carbon nanotubes are single wall, double wall, multiwall or mixtures thereof. The discrete carbon nanotubes can further comprise at least a portion of the plurality of discrete carbon nanotubes having an aspect ratio of more than about 10 and less than about 5000, preferably having an aspect ratio of more than about 10 and less than about 1000, and more preferably having an aspect ratio of more than about 20 and less than about 500.

Another embodiment of this invention is the discrete carbon nanotubes can further comprise discrete carbon nanotubes with a bimodal or multimodal population of diameters or aspect ratios with the peak values of at least two of the modes of diameter, or aspect ratio, differing by a value greater than about 25% relative to the peak at lowest value, preferably more than about 50% relative to the peak at lowest value.

In yet another embodiment of this invention at least a portion of the discrete carbon nanotubes can be further functionalized with organic or inorganic species. These inorganic species can be selected from the group consisting of metals, metal oxides, organometallics and metal salts. The ratio of the weight of the functionalized species relative to weight of the discrete carbon nanotubes is preferably about 0.01 to about 0.9, more preferably about 0.01 to about 0.5 and most preferably about 0.02 to about 0.5. The organic species can be selected from the class of organic molecules consisting of carbon. The inorganic or organic species can be bonded to the discrete carbon nanotube via covalent, ionic, or hydrogen bonding forces. Preferably the inorganic or organic species are bonded via covalent or ionic bonding forces, and most preferably by covalent bonding forces. The at-least a portion by weight of functionalized discrete carbon nanotubes comprise at least about 1% and less or equal to 100% of the total weight of discrete carbon nanotubes.

Yet another embodiment of this invention is that the additive, dispersed within the bundles or clumps of carbon nanotubes and at least partially coating a surface of the discrete carbon nanotubes, may be in the form of layers or particles. The particles or layers have at least one dimension of size less than about 1000 nm, preferably less than about 200 nm and most preferably less than about 50 nm.

In one further embodiment of this invention is that the at least one additive dispersed within the plurality of discrete carbon nanotubes re-aggregated into bundles or clumps is in the range of about 0.1% to about 80% by weight of the bundles or clumps and additive, preferably in the range of about 0.5% to about 50% by weight, more preferably in the range of about 0.5% to about 35% by weight and most preferably in the range of about 1 to about 20% by weight.

Another embodiment of this invention is a composition comprising discrete carbon nanotubes and an additive, wherein the additive is a polymer. The polymer has a weight average molecular weight from about 200 to about 1,000,000 daltons, preferably about 200 to about 400,000 daltons, more preferably about 300 to about 100,000 daltons and most preferably about 400 to about 50,000 daltons. The polymer molecules may be linear, or branched, amorphous or semicrystalline, homopolymer or copolymer of random, alternating or block monomer units of differing types. Blends of polymers may also be an embodiment of this invention. A further preference is that the polymer has the characteristics of a wax in that it is a malleable solid that can be melted to form a flowable liquid.

A further embodiment of this invention is that the additive is a polymer or polymer combinations selected from the group consisting of vinyl polymers, polyolefins, fluorocarbons, polyacetals, polyurethanes, polyethers, polyamides, cellulosics, and polyesters. Preferably the additive is selected from the group consisting of polyethylene oxides.

Yet another embodiment of this invention is that the polymer has a glass transition temperature below 150 degrees centigrade, preferably below 100 degrees centigrade, more preferably below 50 degrees centigrade and most preferably below 25 degrees centigrade. The polymer may have a coefficient of friction, (static or dynamic and as measured using a dry polymer film against a dry polished steel surface), of less than about 0.3, preferably less than about 0.2 and more preferably less than about 0.1.

Another embodiment of this invention is that the composition can further comprise materials selected from the group consisting of carbon fibers, carbon black, graphene, oxidized graphene, reduced graphene, graphite, non-discrete carbon nanotube bundles, and electron or ion conducting liquids or polymers. The electron or ion conducting polymers may at least partially coat a surface of the discrete carbon nanotubes. The electron or ion conducting liquids or polymers can be selected from the group consisting of polypyrroles, polyanilines, poly(fluorene)s, polyphenylenes, polypyrenes, polyazulenes, polynaphthalenes, polycarbazoles, polyindoles, polyazepines, and ionic liquids. The ionic liquids can be selected from the group consisting of molecules with imidazole species. The materials may be added at a concentration by weight from about 0.5% to about 99% by weight of the discrete carbon nanotubes, preferably from about 1% to about 75% by weight of the discrete carbon nanotubes, more preferably from about 1% to about 50% by weight of the discrete carbon nanotubes, and most preferably from about 1% to about 20% by weight of the discrete carbon nanotubes.

Another embodiment of this invention is that the composition can comprise active material. Preferably the active material for a lithium ion battery is a lithium-ion active material. The lithium-ion active material is selected from the group consisting of transition metal oxides, transition metal salts, silicon, silicon oxide, tin, graphite, hard carbon, gallium, germanium, electroactive ceramics sulfur, graphene, graphene oxide, lithium, and titanium dioxide. The active material can be in the weight ratio of active material to the plurality of discrete carbon nanotubes in the form of reaggregated bundles or clumps from about 0.999 to about 0.5, preferably 0.999 to about 0.8, more preferably about 0.999 to about 0.9 and most preferably about 0.999 to about 0.95.

BRIEF DESCRIPTION OF THE FIGURES

For a more complete understanding of the present disclosure, and the advantages thereof, reference is now made to the following descriptions to be taken in conjunction with the accompanying figures for describing specific embodiments of the disclosure, wherein.

DETAILED DESCRIPTION OF THE INVENTION

Figure 1:
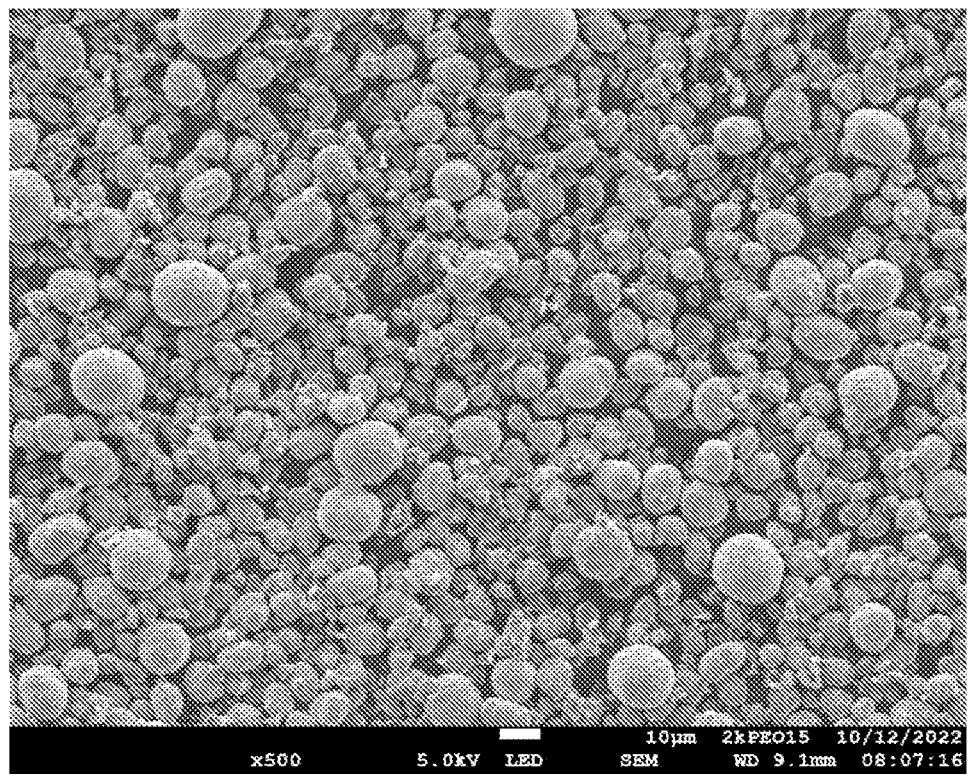
FIG. 1 is an electron micrograph at 500× magnification of a sample from Example 1, a dispersion using the Wig-L-bug machine of the mixture of NMC with initially reaggregated plurality of discrete multiwall carbon nanotubes and 10% by weight of polyethylene oxide, molecular weight 2000 daltons, coated onto the plurality of discrete carbon nanotubes, Bundles of reaggregated discrete multiwall carbon nanotubes of bundle diameter greater than about 10 microns are not observed.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification, or if the incorporation is necessary for maintaining validity.

Any of the aspects disclosed in this invention with discrete carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure. Nanotubes are tubular structures that have a diameter of at least about 1 nanometer and up to about 100 nanometers. Examples of nanotubes are single, double and multiwall carbon nanotubes or titanium dioxide nanotubes. In some cases, the tubular structures may be rolled up sheets. The aspect ratio is defined as the ratio of the tube length to the tube diameter. The average aspect ratio is defined as the average tube length divided by the average tube diameter. The term "discrete carbon nanotubes" as used herein refers to carbon nanotubes that have two ends, or more if the carbon nanotubes are branched. The individual tubes can be organized into structures such as an entangled bundle, mat or oriented structures comprising many individual tubes. The ends may be open rather than closed.

One or more films of a composition for an energy storage or energy collection device can be fabricated with a plurality of discrete carbon nanotubes in the form of reaggregated bundles or clumps, and at least one additive dispersed within the bundles wherein the additive at least partially coats a surface of the discrete carbon nanotubes using a fabrication process with less than about 10,000 ppm of an aqueous or non-aqueous solvent. A typical non-aqueous solvent for making a cathode for a lithium-ion battery is n-methyl pyrrolidone, NMP, which is employed to solubilize polyvinylidene difluoride, PVDF, used as a binder.

Active material is that material used for the purpose of energy storage or energy collection to store or provide energy. Although not limiting, examples of an active material for a lithium-ion battery are transition metal oxides, transition metal salts, silicon, silicon oxide, tin, graphite, hard carbon, gallium, germanium, electroactive ceramics sulfur, graphene, graphene oxide, lithium, and titanium dioxide. A common active material for a cathode of a lithium-ion battery is nickel-manganese-cobalt oxide, NMC. A common active material for an anode of a lithium-ion battery is graphite.

A method for preparing an electrode of a battery or capacitor may include mixing active material with the composition of this invention and subsequently calendering the mixture to form a free-standing film. In some instances, additional polymers, sometimes named binders, such as but not limited to, PVDF, polytetrafluoroethylene, acrylonitrile rubber, polyacrylic acid, styrene butadiene and carboxymethyl cellulose, may be employed to bind the active material to itself. The binder may also bind the active material to the electron conductor. The current collector can also be coated with an adhesive.

The static or dynamic coefficient of friction of a polymer may be determined using ASTM D1894. A general procedure is a specimen of the polymer is attached to a sled of a specified weight. The sled is pulled across the second surface such as polished steel at a speed of 150 mm/minute. The force to get the sled started (static) and to maintain motion (kinetic) is measured. The coefficient of friction is determined as the ratio of the static or dynamic force to the weight of the sled.

The glass transition temperature and melting characteristics of a polymer can be determined using a differential scanning calorimeter. Typical 5-10 mg of the polymer is placed in an aluminum pan and analyses performed in the range of minus 80 degrees centigrade to 400 degrees centigrade with a heating rate of 10 degrees centigrade per minute under nitrogen atmosphere.

The aqueous or non-aqueous solvent content of a mixture can be determined using thermogravimetric analyses, TGA. A procedure is to take approximately 5-20 mg of the sample and heat from 25 degrees centigrade to about 50 degrees centigrade above the boiling point of the solvent at 10 degrees centigrade per minute heating rate in a nitrogen atmosphere.

The procedure for measuring the average aspect ratio of discrete carbon nanotubes is to take about 1 mg of discrete carbon nanotubes and disperse into 10 ml of isopropyl alcohol with vigorous shaking. A drop of that dispersion is quickly placed on copper film attached to an aluminum stub, dried and placed in a scanning electron microscope. The accelerating voltage for the electron beam is set at 5 kv and the length of at least 10 individual carbon nanotubes determined at magnification of 5000× or more.

Scanning electron microscopy is used to determine the nature of the additive within the reaggregated discrete carbon nanotubes and also the dispersion of discrete carbon nanotubes within a film of active material by deposition of the sample onto a carbon tape and using an accelerating voltage of 5 kv.

To rank the efficacy of dispersion of the reaggregated bundles or clumps of discrete carbon nanotubes with less than 10,000 ppm of aqueous or non-aqueous solvents, a Wig-L-Bug grinding machine or other type of ball mill employed. Approximately 1 g of material is added to a stainless-steel container with a stainless-steel ball bearing and subjected to vigorous shaking for a set period of time. With extended times of vigorous shaking further disaggregation of the bundles or clumps of discrete carbon nanotubes can be obtained.

Example 1

Mixing of NMC and reaggregated discrete multiwall carbon nanotubes with 10% wt. polyethylene oxide, PEO, molecular weight 2000 daltons.

Multiwall carbon nanotubes with an average nanotube diameter of 14 nm are obtained from Jiangsu CNano Technology Ltd. in the form of large bundles. 20 g of the carbon nanotubes are mixed into water to form a 2% by weight slurry and homogenized to make a slurry of a plurality of discrete carbon nanotubes with an average aspect ratio (L/D) of about 60.

PEO, molecular weight 2000 daltons, has the characteristics of a wax at room temperature. 2 g of PEO of molecular weight 2000 daltons is dissolved in 20 g of water and added to the slurry of a plurality of discrete multiwall carbon nanotubes followed by mixing with an overhead stirrer fitted with a propellor blade for 1 hour. The slurry of a plurality of discrete multiwall carbon nanotubes and PEO is filtered using a Buchner filter fitted with a 5 micrometer mesh polypropylene filter and a vacuum pump. The resultant wet cake is dried at 100 degrees centigrade in an oven for 4 hours until dried to less than 1000 ppm of water and mixed for 1 minute in a blade mixer to obtain a free-flowing powder of a plurality of discrete carbon nanotubes in the form of reaggregated bundles or clumps with 10% wt. PEO, molecular weight 2000 daltons. The reaggregated plurality of discrete multiwall carbon nanotubes with 10% wt. PEO are in the form of bundles of size approximately 100 micrometers to 500 micrometers in diameter. SEM analyses at high magnification show the PEO to have coated the discrete carbon nanotubes.

NMC, 50% wt. nickel, 20% wt. Manganese and 30% wt. Cobalt oxide, was obtained from BASF. 0.98 g of, NMC, and 0.02 g of the powder of reaggregated discrete carbon nanotubes and 10% wt. polyethylene oxide is added to a stainless-steel container fitted with a stainless-steel ball bearing and subjected to vigorous shaking using a Wig-L-Bug grinding machine for 15 seconds at 25 degrees centigrade. The resultant mixture is examined by electron microscopy as seen in the electron micrographs of FIGS. 1 and 2.

FIG. 1 is an electron micrograph at 500× magnification of a sample from Example 1, a dry dispersion using the Wig-L-bug machine of the mixture of NMC with initially reaggregated plurality of discrete multiwall carbon nanotubes and 10% by weight of polyethylene oxide, molecular weight 2000 daltons, coated onto the plurality of discrete carbon nanotubes, Bundles of reaggregated discrete multiwall carbon nanotubes of bundle diameter greater than about 10 microns are not observed.

Figure 2:
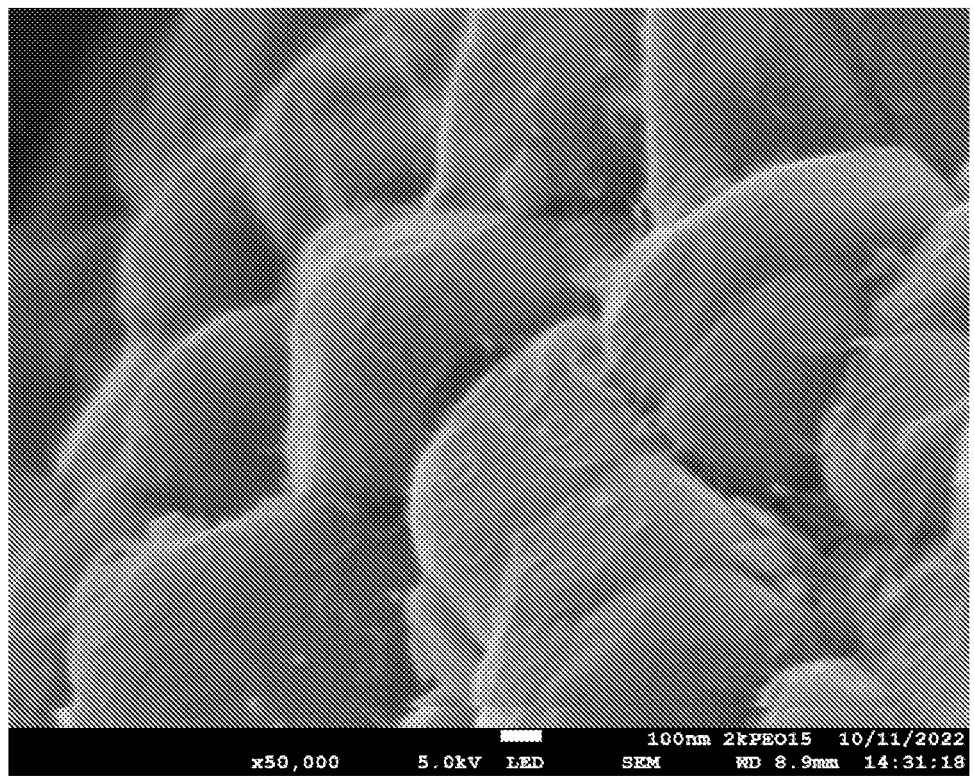
FIG. 2 is an electron micrograph at 50,000× magnification of a sample from Example 1. Individual discrete carbon nanotubes are observed to be distributed on the surface of the NMC particles.

FIG. 2 is an electron micrograph at 50,000× magnification of the same sample from Example 1. Individual discrete carbon nanotubes are observed to be distributed on the surface of the NMC particles.

Control 1

Mixing NMC and bundles of reaggregated discrete multiwall carbon nanotubes with no additive. As Example 1 except that no polyethylene oxide is added to a reaggregated plurality of discrete multiwall carbon nanotubes.

Figure 3:
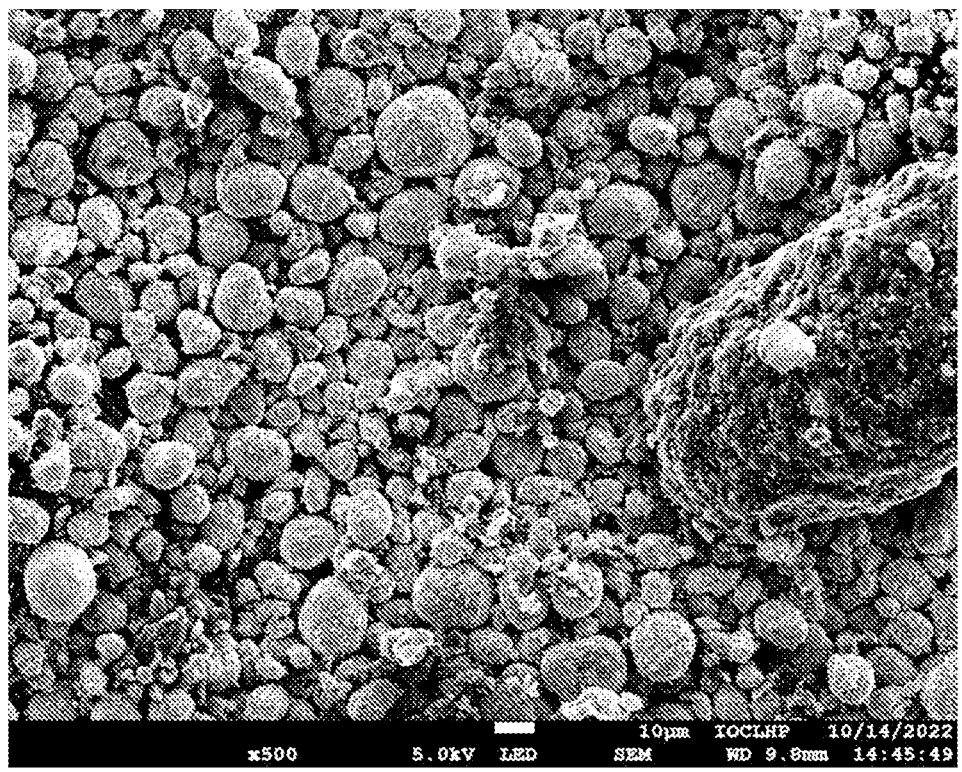
FIG. 3 is an electron micrograph at 500× magnification of a sample of Control 1, a dispersion using the Wig-L-bug machine at 25 degrees centigrade of the mixture of NMC with a reaggregated plurality of discrete multiwall carbon nanotubes and no additive of this invention. Seen in FIG. 3 on the right center is a large bundle of reaggregated plurality of discrete multiwall carbon nanotubes of size greater than 100 micrometers. Large bundles of reaggregated carbon nanotubes in the size range of approximately 50 to 250 micrometers are generally observed in Control 1. Since the majority of the discrete carbon nanotubes remain reaggregated in the form of large bundles, few discrete carbon nanotubes are seen on the NMC particles at higher magnification.

FIG. 3 is an electron micrograph at 500× magnification of a sample of Control 1, a dispersion using the Wig-L-bug machine at 25 degrees centigrade of the mixture of NMC with a reaggregated plurality of discrete multiwall carbon and no additive of this invention. Seen in FIG. 3 on the right center is a large bundle of reaggregated discrete multiwall carbon nanotubes of size greater than 100 micrometers. Large bundles of reaggregated carbon nanotubes in the size range of approximately 50 to 250 micrometers are generally observed in Control 1. Since the majority of the discrete carbon nanotubes remain reaggregated in the form of large bundles, few discrete carbon nanotubes are seen on the NMC particles at higher magnification.

Example 2

Mixing NMC and reaggregated discrete multiwall carbon nanotubes with 30% wt. polyethylene oxide of molecular weight 2000 daltons.

Figure 4:
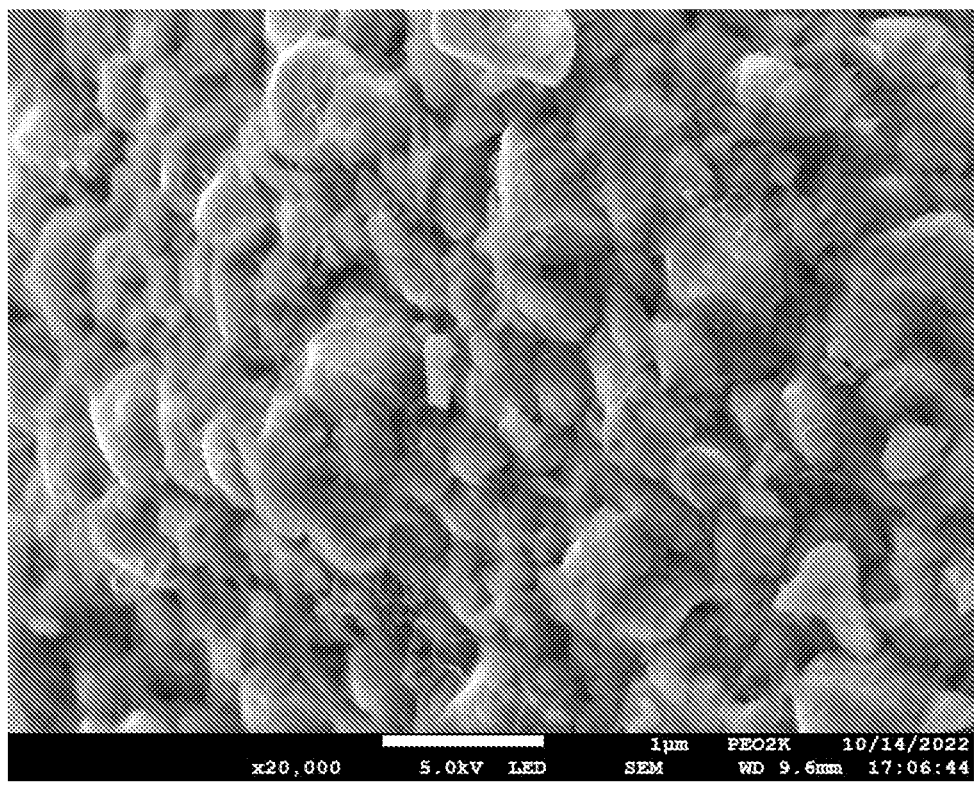
FIG. 4 is an electron micrograph at 20,000× magnification of a sample of Example 2. Many more individual carbon nanotubes are seen covering the NMC particle surface in Example 2 as compared to the Control 1.

The sample is made as Example 1 except that 6 g of the polyethylene oxide is employed. FIG. 4 is an electron micrograph at magnification 20,000× of a sample of Example 2. Many more individual carbon nanotubes are seen covering the NMC particle surface in Example 2 as compared to the Control 1.

Example 3

Mixing NMC and reaggregated discrete multi-wall carbon nanotubes with 10% wt. PVDF.

Multiwall carbon nanotubes with an average nanotube diameter of 14 nm are obtained from Jiangsu CNano Technology Ltd. PVDF is obtained from Solvay and has a molecular weight about 900,000 daltons. 20 g of the carbon nanotubes are mixed into n-methylpyrollidone, NMP, to form a 2% by weight slurry. 2 g of PVDF is dissolved in 40 g of NMP with heating to 60 degrees centigrade and added to the slurry of multiwall carbon nanotubes in NMP followed by mixing with an overhead stirrer fitted with a propellor blade for 1 hour. The slurry is then homogenized and filtered using a Buchner filter fitted with a 5 micrometer mesh polypropylene filter and a vacuum pump to give a wet cake of bundles of reaggregated discrete multiwall carbon nanotubes of average aspect ratio about 60 and 10% wt.

PVDF and NMP. The resultant wet cake is dried at 150 degrees centigrade in an oven for 12 hours until less than 1000 ppm of NMP is determined by TGA and mixed for 1 minute in a blade mixer to obtain a free-flowing powder.

The reaggregated plurality of discrete multiwall carbon nanotubes containing 10% wt. PVDF in are in the form of bundles of size approximately 100 micrometers to 500 micrometers in diameter. 0.98 g of, NMC and 0.02 g of the reaggregated discrete multiwall carbon nanotubes with 10% wt. PVDF is added to a stainless-steel container fitted with a stainless-steel ball bearing and subjected to vigorous shaking using a Wig-L-Bug grinding machine for 15 seconds. The resultant mixture is examined by electron microscopy as seen in FIGS. 5 and 6.

Figure 5:
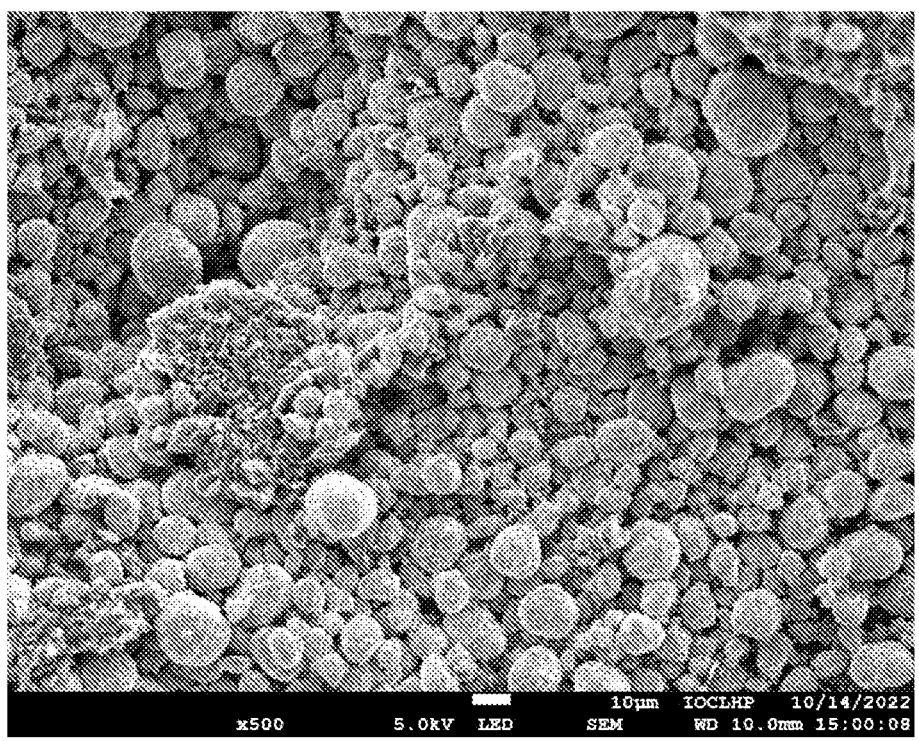
FIG. 5 is an electron micrograph at 500× magnification of a sample of Example 3. NMC with 2% by weight of discrete multiwall carbon nanotubes containing 10% by weight PVDF. Bundles of reaggregated discrete multiwall carbon nanotubes are observed with diameters approximately 30 to 200 micrometers.

Shown in FIG. 5 is an electron micrograph of a sample of example 3, NMC with 2% by weight of discrete multiwall carbon nanotubes containing 10% by weight PVDF. Bundles of reaggregated discrete multiwall carbon nanotubes are observed with diameters approximately 30 to 200 micrometers. Some domains of discrete multiwall carbon nanotubes with PVDF and individual discrete multiwall carbon nanotubes were observed to have been deposited onto the NMC particles at higher magnification of 10,000×, FIG. 6.

Figure 6:
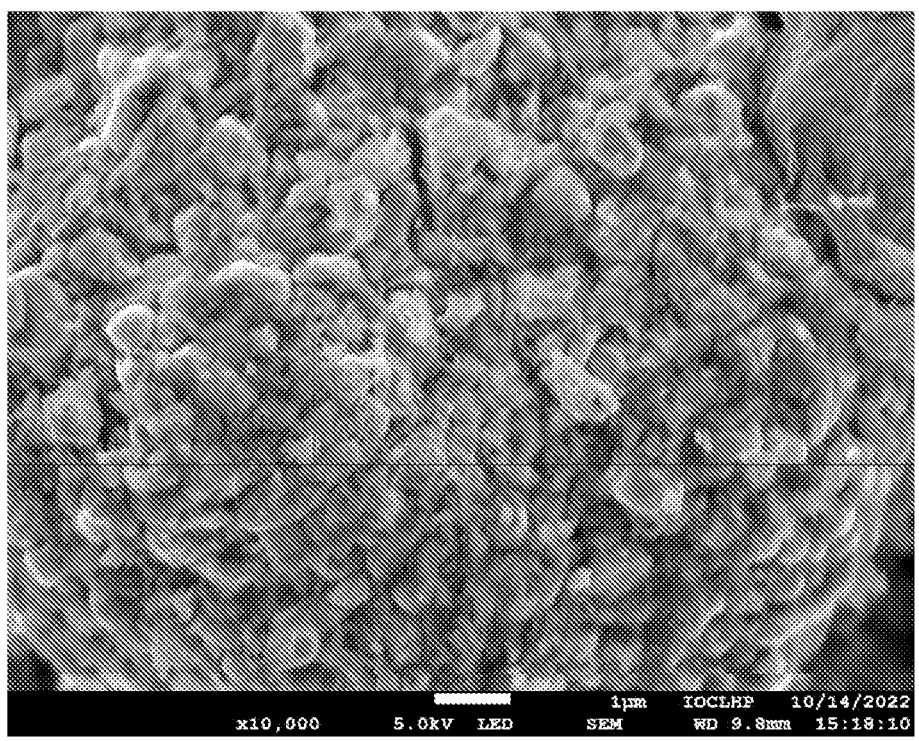
FIG. 6 is an electron micrograph at 10,000× magnification of a sample of Example 3. Some domains of discrete multiwall carbon nanotubes with PVDF and individual discrete multiwall carbon nanotubes were observed to have been deposited onto the NMC particles.

Shown in FIG. 6 is an electron micrograph at 10,000× magnification of a sample of Example 3, NMC with 2% by weight of discrete multiwall carbon nanotubes containing 10% by weight polyvinylidene difluoride. Discrete carbon nanotubes with PVDF (the darker regions) are observed to have been deposited onto the NMC particles. A higher temperature for the mixing of Example 3, for example at 120 degrees centigrade, is expected to result in an increased fraction of disaggregated discrete carbon nanotubes.

Example 4

Figure 7:
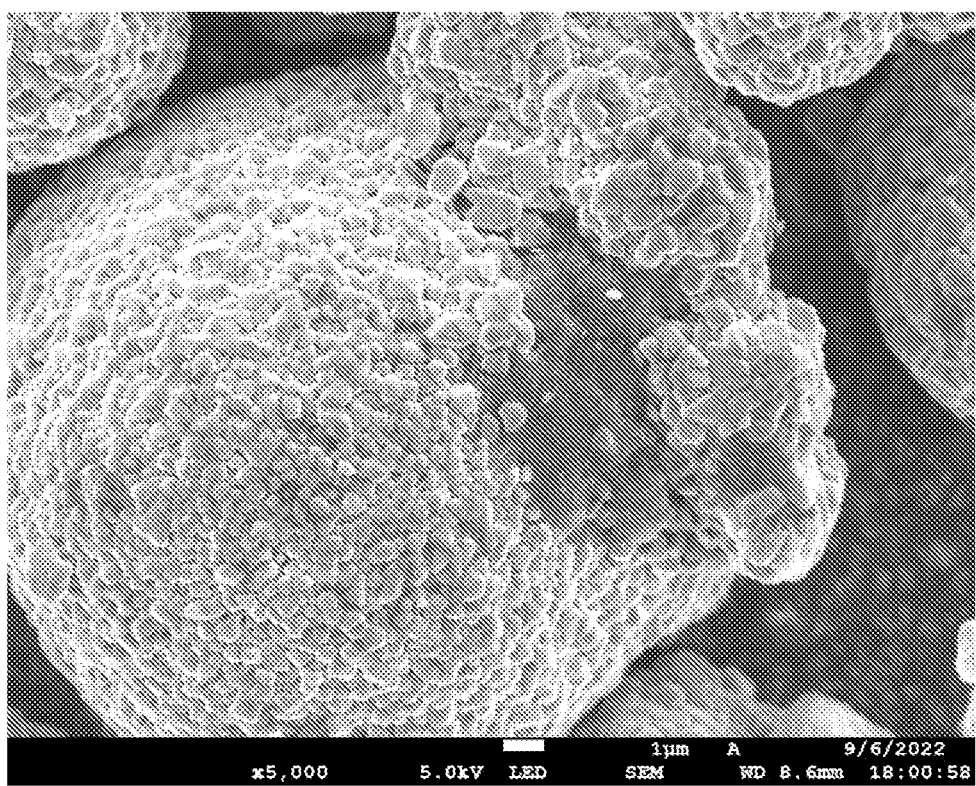
FIG. 7 is an electron micrograph at 5,000× magnification of a sample of Example 4. The areas of darker contrast are regions of discrete carbon nanotubes and PVDF adhering to the surface of the NMC particles.

Mixing NMC and reaggregated discrete multiwall carbon nanotubes with 1% wt. PVDF. The sample was made in a similar manner as example 3 but using 0.2 g of PVDF dissolved in NMP. Shown in FIG. 7 is an electron micrograph at 5,000× magnification of a sample of Example 4. The areas of darker contrast are regions of discrete carbon nanotubes and PVDF adhering to the surface of the NMC particles. With increasing amounts of agitation, the reaggregated discrete carbon nanotubes are expected to disaggregate further.

Figure 8:
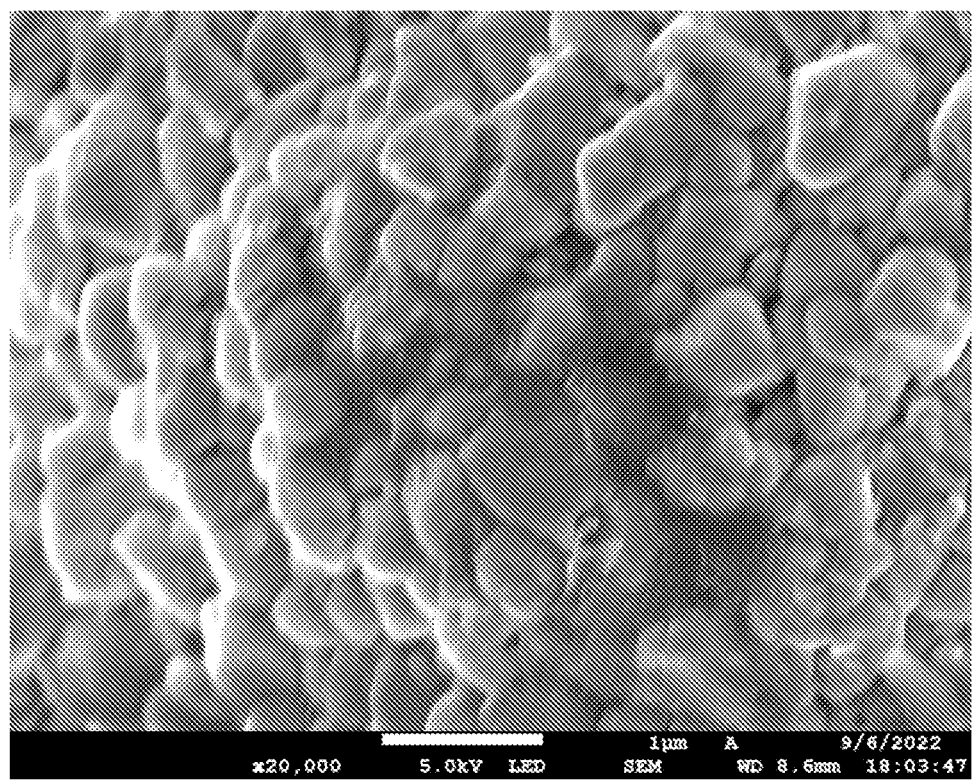
FIG. 8 is an electron micrograph at 20,000× magnification of a sample of Example 4. The areas of darker contrast are regions of discrete carbon nanotubes and PVDF adhering to the surface of the NMC particles. Some individual discrete carbon nanotubes are also observed on the NMC particles.

Shown in FIG. 8 is an electron micrograph at 20,000× magnification of a sample of Example 4. The areas of darker contrast are regions of discrete carbon nanotubes and PVDF adhering to the surface of the NMC particles. Some individual discrete carbon nanotubes are also observed on the NMC particles.

Example 5

Mixing NMC and reaggregated discrete carbon nanotubes and PTFE at ratio of the plurality of discrete carbon nanotubes to PTFE of 1 to 2.

Multiwall carbon nanotubes with an average nanotube diameter of 14 nm are obtained from Jiangsu CNano Technology Ltd. 20 g of the carbon nanotubes are mixed into water to form a 2% by weight slurry and homogenized to make aggregated discrete multiwall carbon nanotube bundles with a plurality of discrete carbon nanotubes with an average aspect ratio of about 60.

50 g of the slurry of reaggregated plurality of discrete carbon nanotube are mixed with 10.41 g of a polytetrafluorethylene, PTFE, latex (19.2% solids, Chemours) for 1 hour using an overhead mixer fitted with a propellor blade. The mixture is filtering using a Buchner filter and vacuum pump then dried at 100 degrees centigrade in an oven for 4 hours. The dried cake is then mixed for 1 minute in a blade mixer to obtain a free-flowing powder containing 33.3% wt. of reaggregated plurality of discrete multiwall carbon nanotubes and 66.6% wt. of PTFE. The PTFE particles are mainly trapped within the bundles of the reaggregated discrete multiwall carbon nanotubes. The reaggregated discrete multiwall carbon nanotubes containing the PTFE particles are in the form of bundles of size approximately 100 micrometers to 1 millimeter in diameter.

0.94 g of NMC and 0.06 g of the powder of reaggregated plurality of discrete multiwall carbon nanotubes and PTFE is added to a stainless-steel container fitted with a stainless-steel ball bearing and subjected to vigorous shaking using a Wig-L-Bug grinding machine for 15 seconds. The resultant mixture is examined by electron microscopy as seen in the micrographs of FIGS. 9 and 10.

Figure 9:
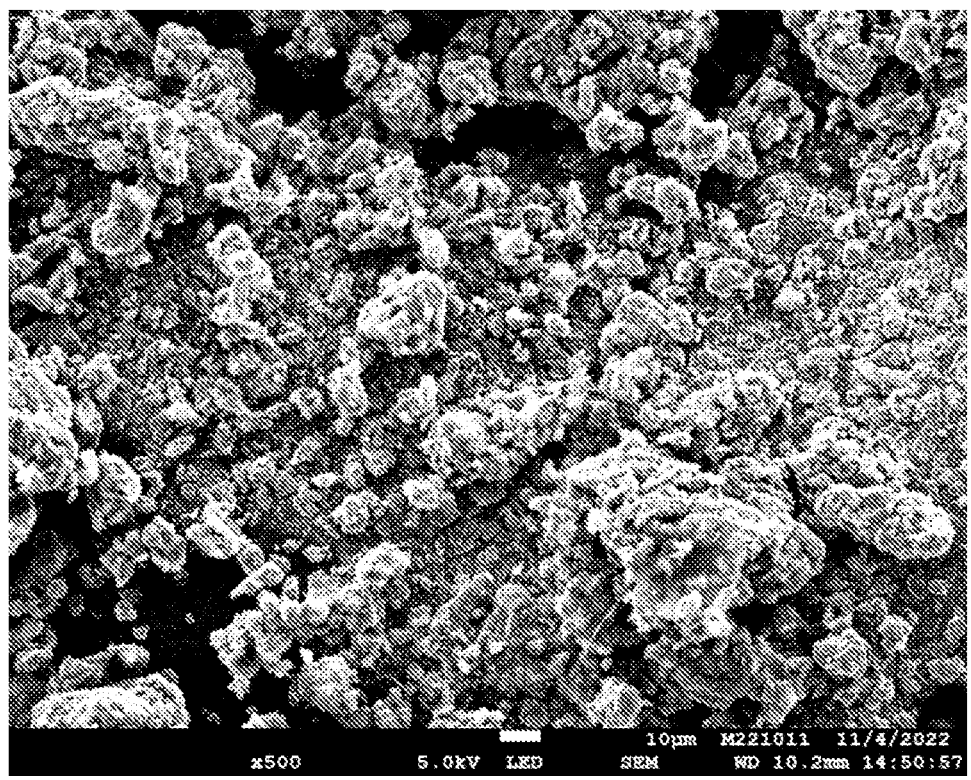
FIG. 9 is an electron micrograph at 500× magnification of a sample of Example 5. Bundles of reaggregated discrete carbon nanotubes are observed with diameters approximately 10 to 50 micrometers. These bundles are smaller than those observed in Control 1 showing the particles of PTFE within the initially larger bundles of reaggregated discrete multiwall carbon nanotubes have aided in the break-up of the initially larger bundles.

Shown in FIG. 9 is an electron micrograph of a sample of Example 5 at magnification 500×. Bundles of reaggregated discrete carbon nanotubes are observed with diameters approximately 10 to 50 micrometers. These bundles are smaller than those observed in Control 1 showing the particles of PTFE within the initially larger bundles of reaggregated discrete multiwall carbon nanotubes have aided in the break-up of the initially larger bundles.

Figure 10:
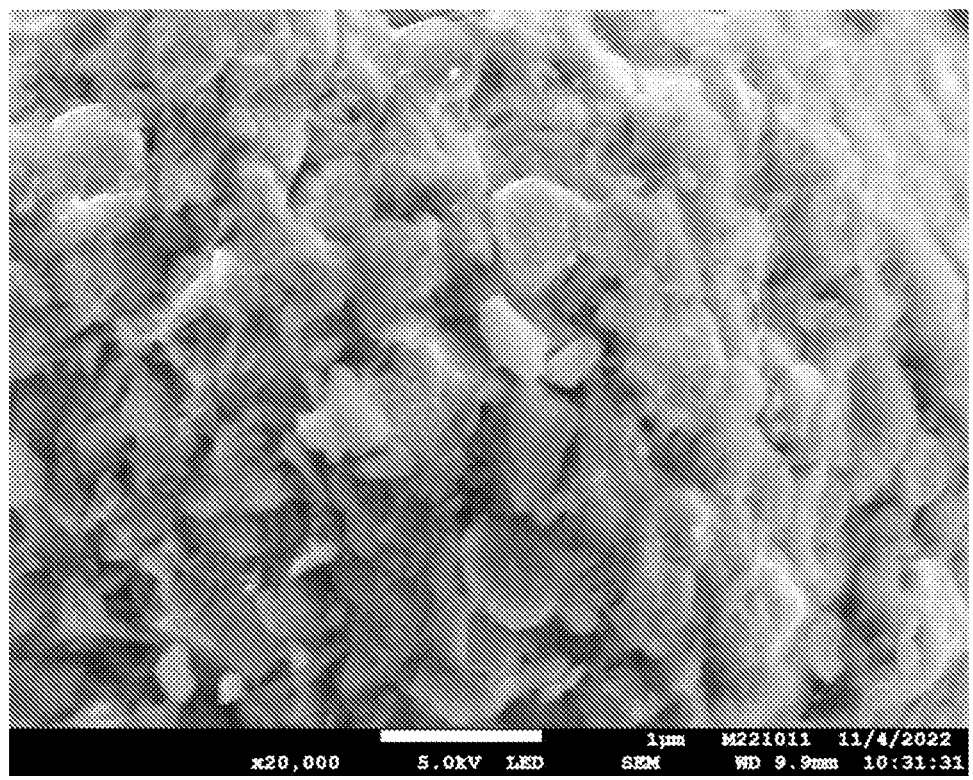
FIG. 10 is an electron micrograph at 20,000× magnification of Example 5. Discrete carbon nanotubes are observed on the NMC particle surface. PTFE particles are observed as being less electron dense than the NMC or carbon nanotubes thus appearing white, as seen in the center of the micrograph.

Shown in FIG. 10 is an electron micrograph at magnification 20,000× of Example 5. Discrete carbon nanotubes are observed on the NMC particle surface. PTFE particles are observed as being less electron dense than the NMC or carbon nanotubes thus appearing white, as seen in the center of the micrograph.

Example 6

Mixing NMC and reaggregated discrete carbon nanotubes with 10% wt. PEO, molecular weight 2000 daltons, and PTFE at weight ratio of discrete carbon nanotubes to PTFE of about 1 to 2 Example 6 is made as Example 5 except that the PTFE latex is mixed with a 2% wt. slurry of reaggregated discrete multiwall carbon nanotubes with 10% wt. PEO of molecular weight 2000 daltons. On drying the PTFE particles are mainly within the bundles of reaggregated discrete multiwall carbon nanotubes coated with 10% wt. PEO, molecular weight 2000 daltons.

Figure 11:
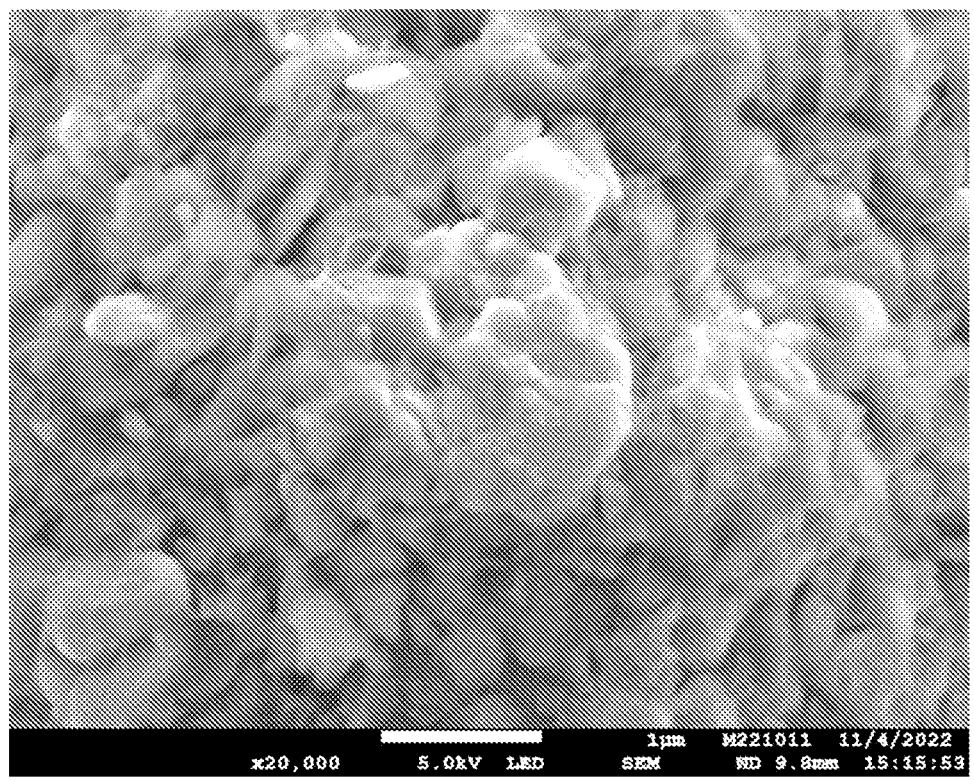
FIG. 11 is an electron micrograph at 20,000× magnification of a sample of Example 6. Seen are NMC particles with discrete carbon nanotubes on their surface obtained from the mixing of NMC with reaggregated discrete multiwall carbon nanotubes containing 10% wt. PEO, molecular weight 2000 and PTFE in the weight ratio of PTFE to carbon nanotubes of about 2 to 1 and where the solvent content is less than 1000 ppm of the composition.

Smaller bundles are observed in Example 6 when mixed under the same conditions as Example 5, and consequently more discrete carbon nanotubes are seen to have dispersed onto the NMC particles, shown in the electron micrograph, FIG. 11.

Shown in FIG. 11 is an electron micrograph at magnification 20,000× of a sample of Example 6. Seen are NMC particles with discrete carbon nanotubes on their surface obtained from the mixing of NMC with reaggregated discrete multiwall carbon nanotubes containing 10% wt. PEO, molecular weight 2000 and PTFE in the weight ratio of carbon nanotubes to PTFE of 1 to 2 and where the solvent content is less than 1000 ppm of the composition.

Control 2

Mixing NMC and bundles of reaggregated discrete carbon nanotubes with 10% wt. PEO, molecular weight 2000 daltons, where the PTFE is primarily coating the outside of the bundles.

Figure 12:
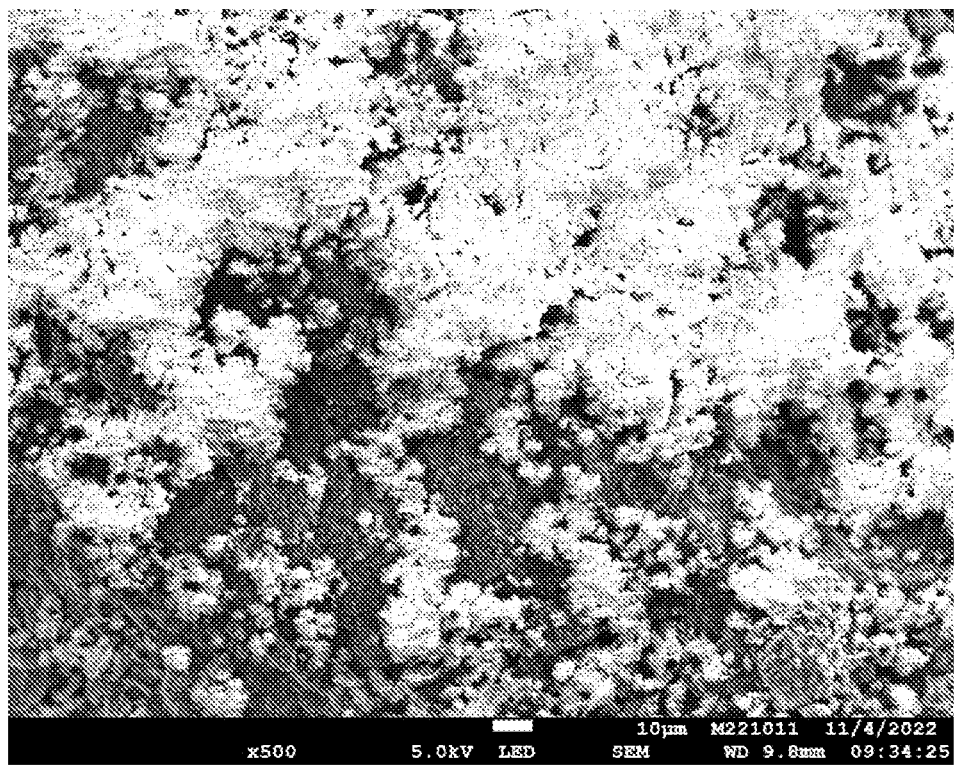
FIG. 12 is an electron micrograph at 500× magnification of bundles of reaggregated discrete multiwall carbon nanotubes with 10% wt. PEO (dark areas of the micrograph) coated with PTFE (white particles). The PTFE is judged to be mainly on the outside of the bundles of reaggregated discrete carbon nanotubes. The ratio by weight of PTFE to the bundles of discrete carbon nanotubes is two to one.

A sample of reaggregated plurality of discrete multiwall carbon nanotubes with 10% wt. PEO, Molecular weight 2000 daltons, prepared as Example 1, is dried at 100 degrees centigrade. 1 g of the dried material is then added to 2 g of PTFE (10.41 g of the latex with 19.2% solids) and 30 g of water added. The mixture is stirred briefly, then filtered and dried. FIG. 12 shows that the PTFE resides mainly on the outside of the bundles of the reaggregated plurality of discrete multiwall carbon nanotubes.

Shown in FIG. 12 is an electron micrograph at magnification 500× of bundles of reaggregated plurality of discrete multiwall carbon nanotubes with 10% wt. PEO (dark areas of the micrograph) coated with PTFE (white particles). The PTFE is judged to be mainly on the outside of the bundles of reaggregated discrete carbon nanotubes.

0.94 g of NMC and 0.06 g of the bundles of reaggregated discrete multiwall carbon nanotubes coated on the outside of the bundles with PTFE particles are added to a stainless-steel container fitted with a stainless-steel ball bearing and subjected to vigorous shaking using a Wig-L-Bug grinding machine for 15 seconds.

Figure 13:
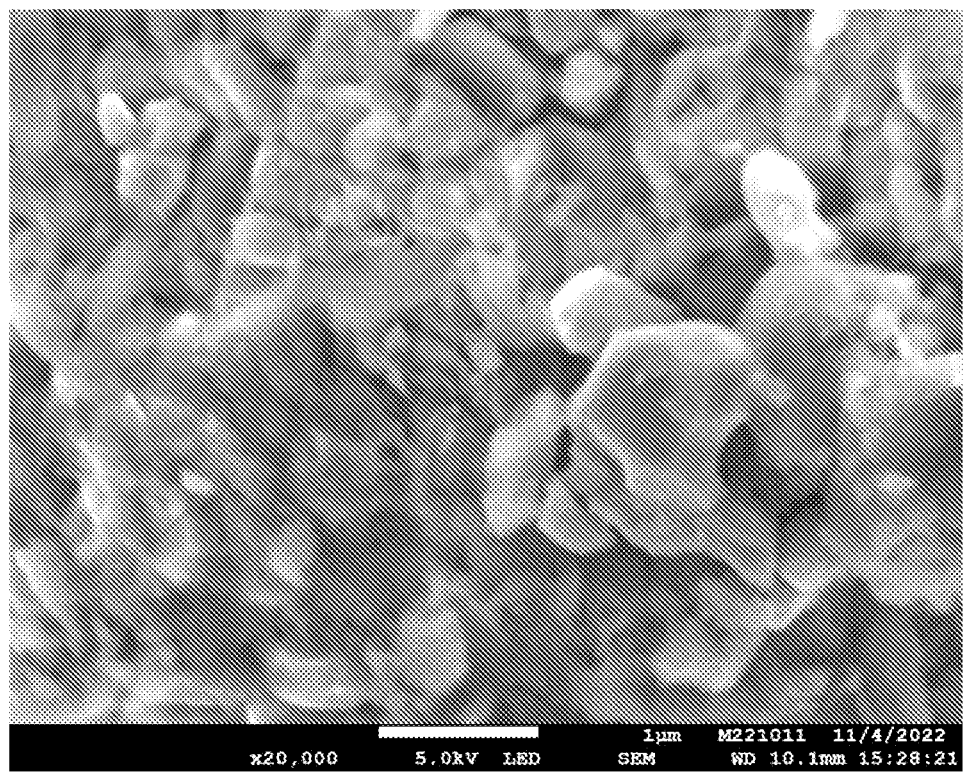
FIG. 13 is an electron micrograph at 20,000× magnification of Control 2, NMC and PTFE coated bundles of reaggregated discrete carbon nanotube with 10% wt. PEO, molecular weight 2000 daltons. The micrograph illustrates that some bundles are disaggregated to give discrete multiwall carbon nanotubes observed on the NMC particle surfaces. Also seen in FIG. 13 is that PTFE particles are deformed.

Shown in FIG. 13 is an electron micrograph at magnification 20,000× of Control 2, NMC and PTFE coated bundles of reaggregated plurality of discrete carbon nanotube with 10% wt. PEO, molecular weight 2000 daltons. The micrograph illustrates that some bundles are disaggregated to give discrete multiwall carbon nanotubes that are on the NMC particle surfaces. Also seen in FIG. 13 is that PTFE particles are deformed. With the PTFE particles on the outside of the initial bundle the PTFE is judged to not facilitate the disaggregation of the bundles of reaggregated discrete carbon nanotubes in comparison to Example 6.

Example 7

Mixing of NMC and reaggregated single wall carbon nanotubes with 1% wt. PVDF.

Single wall carbon nanotubes with an average nanotube diameter about 1.5 nm are obtained from Ocsial. 5 g of the carbon nanotubes are mixed into n-methylpyrrolidone, NMP, to form a 0.5% wt. % slurry. 0.05 g of PVDF of molecular weight about 900,000 daltons is dissolved in 20 g of NMP at 60 degrees centigrade then added to the slurry of single wall carbon nanotube in NMP. The mixture is homogenized to from a slurry of bundles of discrete reaggregated single wall carbon nanotubes with 1% wt. PVDF. The slurry is filtered using a Buchner filter fitted with a 5 micrometer mesh polypropylene filter and a vacuum pump. The resultant wet cake is dried at 150 degrees centigrade in an oven for 12 hours until less than 1000 ppm of NMP is determined and mixed for 1 minute in a blade mixer to obtain a free-flowing powder.

The bundles of reaggregated discrete single wall carbon nanotubes containing 1% wt. PVDF have a diameter of approximately 100 micrometers to 500 micrometers. 0.98 g NMC, and 0.02 g of the powder of reaggregated discrete carbon nanotubes and PVDF is added to a stainless-steel container fitted with a stainless-steel ball bearing and subjected to vigorous shaking using a Wig-L-Bug grinding machine for 15 seconds.

Figure 14:
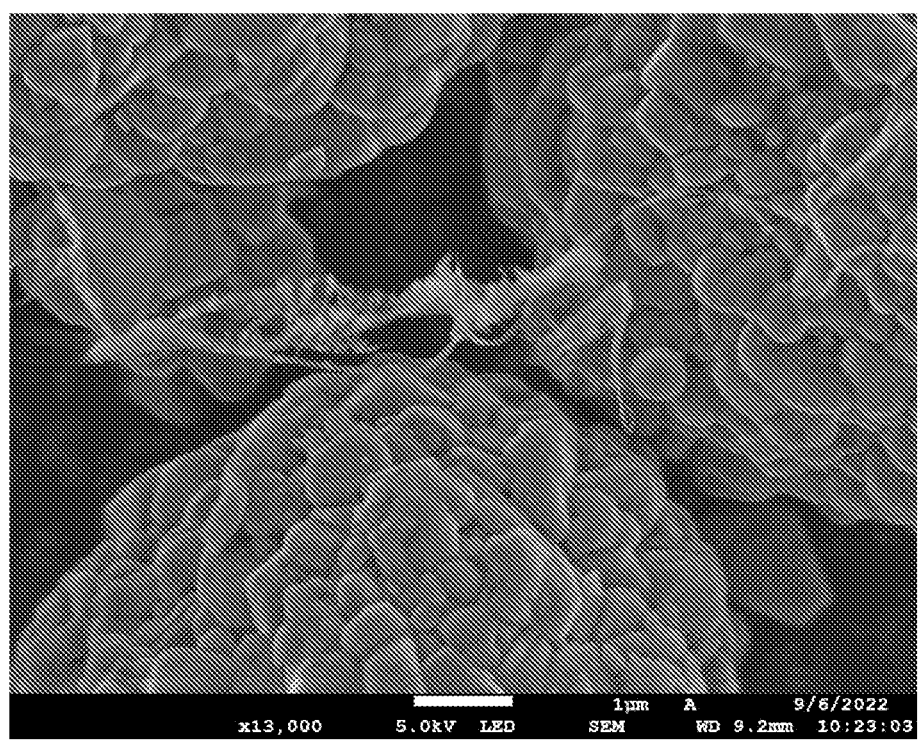
FIG. 14 is an electron micrograph at 13,000× magnification of a sample of Example 7. In the center of the electron micrograph of FIG. 14 are discrete single wall carbon nanotubes with 1% wt. PVDF disaggregated from the original bundles.

Shown in FIG. 14 is an electron micrograph at 13,000× magnification of a sample of Example 7. In the center of the electron micrograph of FIG. 14 are discrete single wall carbon nanotubes with 1% wt. PVDF disaggregated from the original bundles.

Embodiments

1. An electrode manufacturing composition, comprising: less than about 10,000 ppm, based on the total weight of the composition, of an aqueous or non-aqueous solvent,
 a plurality of discrete carbon nanotubes in the form of reaggregated bundles or clumps, and
 at least one additive dispersed within the bundles wherein the at least one additive at least partially coats a surface of the discrete carbon nanotubes.
2. The composition of embodiment 1 wherein the discrete carbon nanotubes comprise single wall, double wall, multiwall, or mixtures thereof.
3. The composition of embodiment 1 wherein the plurality of discrete carbon nanotubes comprise an aspect ratio of more than about 10 and less than about 5000.
4. The composition of embodiment 1 wherein the discrete carbon nanotubes comprise carbon nanotubes with a bimodal or multimodal population of diameters.
5. The composition of embodiment 1 wherein the discrete carbon nanotubes comprise a bimodal or multimodal population of aspect ratios.
6. The composition of embodiment 1 wherein the discrete carbon nanotubes comprise oxidized species.
7. The composition of embodiment 6 wherein the oxidized species are selected from the group consisting of carboxylates, ketones, lactones and hydroxyls.
8. The composition of embodiment 1 wherein at least a portion of the discrete carbon nanotubes are functionalized with organic species comprising carbon.
9. The composition of embodiment 1 wherein at least a portion of the discrete carbon nanotubes are functionalized with inorganic species selected from the group consisting of metals, metal oxides, organometallics and metal salts, and mixtures thereof.
10. The composition of embodiment 1 wherein the at least one additive comprises a ratio by weight of the at least one additive to discrete carbon nanotubes of about 0.05 to about 0.8.
11. The composition of embodiment 1 wherein the at least one additive comprises at least one polymer of weight average molecular weight from about 200 to about 1,000,000 daltons.
12. The composition of embodiment 11 wherein the at least one polymer is selected from the group consisting of polymer molecules, where the molecules are linear, branched, amorphous, semicrystalline, homopolymer, copolymer of random, alternating or block monomer units of differing types, and blends thereof
13. The composition of embodiment 11 wherein the at least one polymer is selected from the group consisting of polyolefins, vinyl polymers, fluorocarbons, polyacetals, cellulosics, polyurethanes, polyethers, polyamides, polyesters, and blends thereof
14. The composition of embodiment 11 wherein the polymer has a glass transition temperature below 150 degrees centigrade.
15. The composition of embodiment 1 further comprising a wax.
16. The composition of embodiment 1 further comprising materials selected from the group consisting of carbon fibers, carbon black, graphene, oxidized graphene, reduced graphene, graphite, non-discrete carbon nanotubes, and electron and ion conducting polymers.
17. The composition of embodiment 1 wherein the aqueous or non-aqueous solvent is less than about 1000 ppm.
18. The composition of embodiment 1 further comprising a lithium-ion active material.

19. The composition of embodiment 1 further comprising sulfur.

20. A composition for use in manufacturing an electrode wherein the composition comprises:
   less than about 10,000 ppm, based on the total weight of the composition, of an aqueous or non-aqueous solvent,
   discrete carbon nanotubes in the form of reaggregated bundles or clumps wherein said discrete carbon nanotubes comprise at least 35% of the total number of nanotubes in the composition, and
   at least one additive dispersed within the bundles wherein the at least one additive at least partially coats a surface of the discrete carbon nanotubes.

21. A composition for use in manufacturing an electrode, comprising
   less than about 10,000 ppm, based on the composition, of an aqueous or non-aqueous solvent,
   a plurality of discrete carbon nanotubes in the form of reaggregated bundles or clumps, and
   a polyethylene oxide with a molecular weight of greater than about 400 daltons to about 50,000 daltons,
   wherein the polyethylene oxide is at least partially dispersed within the bundles and wherein the polyethylene oxide comprises an amount of ratio by weight of the polyethylene oxide to discrete carbon nanotubes of about 0.05 to about 0.8.

What is claimed is:

1. An electrode manufacturing composition, comprising: less than about 10,000 ppm, based on the total weight of the composition, of an aqueous or non-aqueous solvent, a plurality of discrete carbon nanotubes in the form of reaggregated bundles or clumps, and at least one additive dispersed within the bundles wherein the at least one additive at least partially coats a surface of the discrete carbon nanotubes wherein the composition is a dry composition.

2. The composition of claim 1 wherein the discrete carbon nanotubes comprise single wall, double wall, multiwall, or mixtures thereof.

3. The composition of claim 1 wherein the plurality of discrete carbon nanotubes comprise an aspect ratio of more than about 10 and less than about 5000.

4. The composition of claim 1 wherein the discrete carbon nanotubes comprise carbon nanotubes with a bimodal or multimodal population of diameters.

5. The composition of claim 1 wherein the discrete carbon nanotubes comprise a bimodal or multimodal population of aspect ratios.

6. The composition of claim 1 wherein the discrete carbon nanotubes comprise oxidized species.

7. The composition of claim 6 wherein the oxidized species are selected from the group consisting of carboxylates, ketones, lactones and hydroxyls.

8. The composition of claim 1 wherein at least a portion of the discrete carbon nanotubes are functionalized with organic species comprising carbon.

9. The composition of claim 1 wherein at least a portion of the discrete carbon nanotubes are functionalized with inorganic species selected from the group consisting of metals, metal oxides, organometallics and metal salts, and mixtures thereof.

10. The composition of claim 1 wherein the at least one additive comprises a ratio by weight of the at least one additive to discrete carbon nanotubes of about 0.05 to about 0.8.

11. The composition of claim 1 wherein the at least one additive comprises at least one polymer of weight average molecular weight from about 200 to about 1,000,000 daltons.

12. The composition of claim 11 wherein the at least one polymer is selected from the group consisting of polymer molecules, where the molecules are linear, branched, amorphous, semicrystalline, homopolymer, copolymer of random, alternating or block monomer units of differing types, and blends thereof.

13. The composition of claim 11 wherein the at least one polymer is selected from the group consisting of polyolefins, vinyl polymers, fluorocarbons, polyacetals, cellulosics, polyurethanes, polyethers, polyamides, polyesters, and blends thereof.

14. The composition of claim 11 wherein the polymer has a glass transition temperature below 150 degrees centigrade.

15. The composition of claim 1 further comprising a wax.

16. The composition of claim 1 wherein the aqueous or non-aqueous solvent is less than about 1000 ppm.

17. The composition of claim 1 further comprising a lithium-ion active material.

* * * * *